United States Patent
Cook

(10) Patent No.: US 6,248,268 B1
(45) Date of Patent: Jun. 19, 2001

(54) PROCESS OF MAKING MICROPARTICLES OF A THERMALLY-GELLED POLYSACCHARIDE

(75) Inventor: Richard B. Cook, Chelmsford, MA (US)

(73) Assignee: XC Corporation, Lowell, MA (US)

( * ) Notice: Subject to any disclaimer, the term of this patent is extended or adjusted under 35 U.S.C. 154(b) by 0 days.

(21) Appl. No.: 09/192,888

(22) Filed: Nov. 16, 1998

(51) Int. Cl.$^7$ ................................. B29B 9/00; C08J 3/12
(52) U.S. Cl. ................................. 264/12; 210/656
(58) Field of Search ................................. 264/12; 210/656

(56) References Cited

U.S. PATENT DOCUMENTS

| | | |
|---|---|---|
| 3,002,823 | 10/1961 | Flodin et al. . |
| 3,208,994 | 9/1965 | Flodin et al. . |
| 3,275,576 | 9/1966 | Flodin et al. . |
| 3,527,712 | 9/1970 | Renn et al. . |
| 4,016,254 | 4/1977 | Seager . |
| 4,094,833 | 6/1978 | Johansson et al. . |
| 4,375,347 | 3/1983 | Lombardo et al. . |
| 5,019,400 | 5/1991 | Gombotz et al. . |
| 5,053,332 | 10/1991 | Cook et al. . |
| 5,089,407 | 2/1992 | Baker et al. . |
| 5,126,381 | 6/1992 | Liscomb . |
| 5,260,002 | 11/1993 | Wang . |
| 5,271,934 | 12/1993 | Goldberg et al. . |
| 5,409,726 | 4/1995 | Stanley et al. . |
| 5,624,612 | 4/1997 | Sewall et al. . |
| 5,662,840 | 9/1997 | Thomas et al. . |
| 5,718,969 | 2/1998 | Sewall et al. . |

FOREIGN PATENT DOCUMENTS

| | | |
|---|---|---|
| 0 180 366 A2 | 5/1986 | (EP) . |
| 0 366 898 A1 | 5/1990 | (EP) . |
| WO 97/02125 | 1/1997 | (WO) . |

OTHER PUBLICATIONS

Abstract of JP 06 239764 (Aug. 30, 1994), Database WPI, Section Ch, Week 199439, Derwent Publications Ltd., Class A96, Accession No. 1994–313633 XP002134473 (1994).

Su, Horngtwu et al., "Characterization of Alginate Beads Formed by a Two Fluid Annular Atomizer," *Applied Biochemistry and Biotechnology* 20/21:561–569 (1989).

Ogbonna, James, C. et al., "Production of Micro–Gel Beads by a Rotating Disk Atomizer," *Journal of Fermentation and Bioengineering* 68(1):40–48 (1989).

Primary Examiner—Leo B. Tentoni
(74) *Attorney, Agent, or Firm*—Hamilton, Brook, Smith & Reynolds, P.C.

(57) ABSTRACT

Polymer microparticles suitable for gel chromatography are formed by spraying a composition of a thermally-gelling polymer in an aqueous medium into ambient air and allowing the atomized composition to gel in the air. The gelled microparticles have a gel strength sufficient to preserve the structural integrity of the gelled microparticle upon collection thereof.

54 Claims, 4 Drawing Sheets

PROCESS OF MAKING MICROPARTICLES OF A THERMALLY-GELLED POLYSACCHARIDE

BACKGROUND OF THE INVENTION

Figure 1:
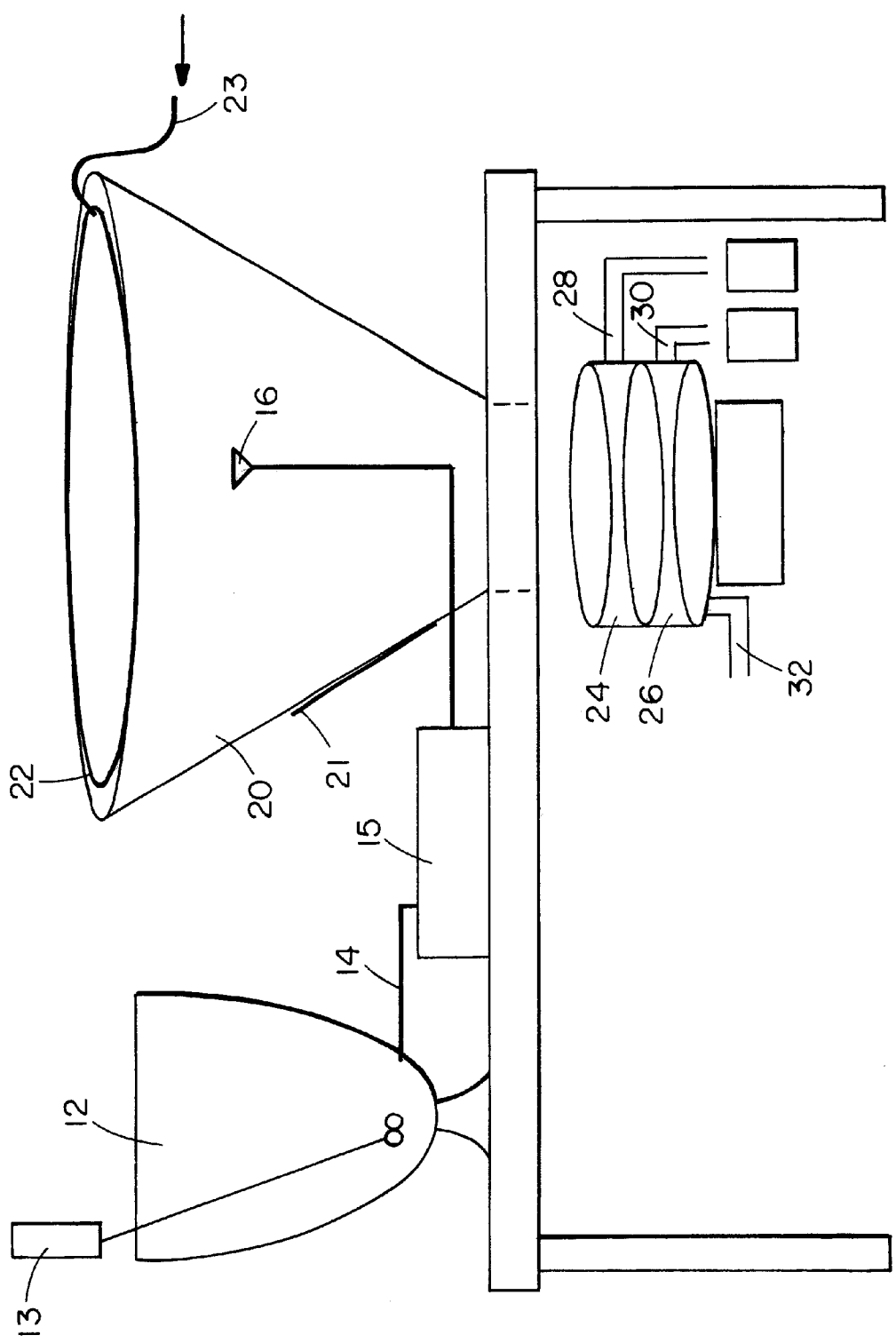

The food, pharmaceutical and biotechnology industries routinely use a column of agarose gel chromatography (AGC) beads or microparticles having diameters in the range of 50 to 400 μm to characterize, fractionate, and purify important biological products.

In one application, known as gel diffusion chromatography (GDC), gelled agarose microparticles are used to separate proteins or soluble polysaccharides by diffusion according to their molecular size. The porosity of the microparticles is a function of the agarose concentration, which generally ranges from 2 to 10% weight/volume (w/v). The balance of the microparticles (i.e., 90 to 98% w/v) is typically water.

In another application, known as affinity chromatography (AC), the polysaccharide microparticles are derivatized and used to specifically isolate and purify certain biological materials.

A third chromatography application is known as ion exchange chromatography (IEC). IEC is a method of separating a mixture of biopolymers (e.g., proteins, polysaccharides or DNA as a few examples) according to their interaction with an ionic matrix. The ionic matrix can contain anionic moieties (e.g., carboxylate or sulfate groups) and/or cationic moieties (e.g., quaternary ammonium groups). Agarose is rarely used in IEC due to its absence of ionic groups unless derivatized.

Microparticles play an important role in GDC in both fractionating and characterizing the molecular weight of proteins, polysaccharides and DNA. Consequently, the microparticles must meet exacting specifications with regard to purity, spherical geometry, and gel concentration. The gel concentration determines the porosity of the medium and hence its sieving properties. The concentration must be uniform both from microparticle to microparticle in a population and within each gel microparticle. No significant regional dehydration or heterogeneity is tolerable unless it is reversible with rehydration.

The spherical geometry of chromatography media is also important in order to achieve maximum resolution or efficacy in mixture separation. This results from the fact that irregularities in microparticle shape result in a looser packing of the microparticles, which increases the void space ($V_o$) between microparticles. As can be seen in the following equations, a low $V_o$ is important in achieving the lowest average diffusion coefficient ($K_{av}$) for a given substance having an elution volume ($V_e$).

$$V_t = V_i + V_o + V_p;$$

$$K_{av} = (V_e - V_o)/(V_t - V_o),$$

where $V_t$ is total volume of the microparticle bed, $V_i$ is internal microparticle volume, and $V_p$ is polymer volume. $K_{av}$ varies from zero, for a substance that is completely excluded from the gel (i.e., $V_e = V_o$) to almost 1 for a very small molecule which will diffuse throughout the gel, thereby making $V_e \approx V_t$.

Thus, as void volume increases for any given volume of packed microparticles, the resolution potential for the bed decreases. One means of increasing the void volume for a given size range of chromatography microparticles is to make the microparticles nonspherical. Such an effect would preclude tight packing as well as adequate porosity within the gel bed thereby causing an increase in void space, elution band broadening and thereby loss of resolution.

The purity of GDC media must be very high since the irreversible inclusion of extraneous organic or inorganic substances in the gelled microparticles will alter both their porosity and affinity characteristics. High gel purity becomes even more important when gel diffusion media are derivatized and converted into AC media. In AC applications, affinities due to extraneous materials within the gel can result in nonspecific binding which compromises the high utility of the AC method. Finally, because GDC and AC media are routinely used as analytical standards for characterizing biomolecules, their uniformity and integrity cannot be compromised.

Conventional methods of forming spherical microparticles for chromatography applications include a microemulsion technique, wherein a heated sol including a thermally-gelling polysaccharide is injected into a heated organic solvent. The sol and the solvent form an emulsion, which is then cooled to allow the sol phase of the emulsion to gel in the form of substantially-spherical microparticles.

Although the microemulsion technique produces microparticles that are generally suitable for chromatography, the technique is not without substantial drawbacks. In particular, the micro-emulsion process for forming gelled microparticles is relatively slow, tedious and costly. Once gelled, the microparticles must then be subjected to an extensive washing process to remove the solvent before the microparticles can be used for chromatography. The inefficiencies generated by these disadvantages increase the cost of the resultant microparticles. Moreover, the organic solvent used to form the microemulsion is a hazardous material which presents health and environmental dangers and requires careful storage, handling and disposal.

SUMMARY OF THE INVENTION

This invention pertains to methods for forming and collecting polymer microparticles suitable for gel chromatography, by spraying a composition of a thermally-gelling polymer and an aqueous medium into ambient air and allowing the atomized composition to gel in the air. The gelled microparticles have a gel strength sufficient to preserve the structural integrity of the gelled microparticles upon collection thereof.

In accordance with one aspect of the invention, the gelled microparticles have a diameter greater than 50 micrometers.

In accordance with other aspects of the invention, the thermally-gelling polymer is a biopolymer in the form of a polysaccharide and is sprayed through an airless nozzle to form a fine mist before gelling into spherical microparticles.

In preferred embodiments, the gelled microparticles are collected on a sloped surface, preferably coated with a film of water. In an alternative preferred embodiment, the gelled microparticles are collected in a basin of water having a reduced surface tension. The gelled microparticles can then be size fractionated as a moist, high-solids slurry. The gelled microparticles can then be stored as a suspension. Finally, the method can further include the step of using the gelled microparticles to perform gel diffusion chromatography, affinity chromatography, or ion exchange chromatography.

Preferably, the gelled microparticles have a diameter of less than 500 micrometers and a solids content ranging from 0.5% to 50% w/v. Further, the gel strength of the microparticles is sufficient for use in performing gel chromatography. In further preferred embodiments, the composition is in the form of a sol and the microparticles remain hydrated throughout the method.

Suitable polysaccharides for use in this invention can include agar, agarose, carrageenan, furcelleran, an extracellular polysaccharide obtained by the aerobic fermentation of *Pseudomonas elodea*, as well as derivatives of each and combinations thereof.

The sprayed composition can be sprayed at a temperature at least 5° C. or 10° C. above the gelling temperature of the thermally-gelling polymer. The composition can be sprayed in an upward (though, preferably, not directly vertical) direction in the form of a hollow cone. Alternatively, the composition can be sprayed laterally or downward, preferably in the form of a full cone. In either case, the form of the spray is preferably a series of pulses.

Preferably, a majority of the gelled microparticles that are thereby formed are monomorphic spheres and are free of air bubbles. In other embodiments, the gelled microparticles include air bubbles.

The methods of this invention offer the advantages of a quick, simple and inexpensive process for forming high-quality gel chromatography media. In addition, the method does not require the use of hazardous chemicals as solvents. Further advantages are found in that the microparticles of this invention are spheres with controlled porosity and a high level of structural and geometric integrity. Further still, this invention affords the ability to more easily incorporate non-gelling polymers, granules, other thermally-gelling polymers or hydrophobic micro-inclusions into the gelled microparticles.

Another advantage is found in that the invention permits the use of high-viscosity, maximum-gel-strength agarose (e.g., having a break force greater than 1,000 g/cm$^2$) for forming microparticles instead of the lower-viscosity, lower-gel-strength agarose routinely found in existing commercial microparticles made by other methods (i.e., approximately 400 g/cm$^2$). Such higher gel-strength agarose microparticles are better able to withstand column pressures without compression, thereby improving column efficiency. The methods of this invention are able to tolerate the increased viscosity that accompanies increased gel strength due to the uniqueness of the atomization and gelling process.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1 is an illustration of an apparatus including an upward-directed nozzle and a sloped collection surface for performing a method of this invention to form microparticles.

FIG. 2 is an illustration of an alternative design of an apparatus including a laterally-directed nozzle and a sloped collection surface for performing a method of this invention to form microparticles.

FIG. 3 is an illustration of another alternative design of an apparatus including a downward-directed nozzle and a sloped collection surface for performing a method of this invention to form microparticles.

FIG. 4 is an illustration of an apparatus including a water-filled basin for collecting gelled microparticles in accordance with a method of this invention.

DETAILED DESCRIPTION OF THE INVENTION

The features and other details of the method of the invention will now be more particularly described with reference to the accompanying drawings and pointed out in the claims. It will be understood that the particular embodiments of the invention are shown by way of illustration and not as limitations of the invention. The principal features of this invention can be employed in various embodiments without departing from the scope of the invention.

An apparatus for performing a method of this invention is illustrated in FIG. 1. The apparatus includes a mezzanine platform 10, upon which is a reservoir 12 filled with a composition, preferably in the form of a sol, and a mixer 13; a conduit 14 for delivering the composition to a sprayer 15 with an airless, water-atomizing nozzle 16 capable of producing a fine mist or spray; a pump 18 for drawing the composition through the conduit 14 and out the nozzle 16; and a collection surface 20 for collecting gelled microparticles. The collection surface 20 includes an access door 21 for adjusting the nozzle 16. A film of water generated by a trickle ring 22 coats the collection surface 20 and helps to channel the gelled microparticles down to an opening onto stacked screens 24, 26. The water is fed to the trickle ring 22 by a low-pressure water inlet 23 and, in addition to facilitating movement of the microparticles, helps to prevent the microparticles from dehydrating. The screens 24, 26 sieve the gelled microparticles by size. Lines 28, 30 provide an outlet for screened microparticles, while line 32 provides an outlet for water discharged from the slurry.

A composition comprising about 0.5% to about 14% w/v of a thermally-gelling polymer (e.g., a polysaccharide) dissolved in an aqueous medium (e.g., water) (about 86% to about 99.5% w/v) is stored in the reservoir 12, which is heated to 100° C. Suitable polysaccharides include, but are not limited to, agar, agarose, carrageenan, furcelleran, and Gellan@, an extracellular polysaccharide obtained by the aerobic fermentation of *Pseudomonas elodea* (manufactured by Merck & Co., Inc. of Whitehouse Station, N.J., USA). Derivatives of these polysaccharides can also be used. However, the derivatization of polysaccharides will often result in a significant loss of strength, which will render the derivatives unsuitable for chromatography applications because they will tend to be deformed or crushed under the packing and head pressure in the column. Accordingly, polysaccharide derivatives which lose more than half of their strength during derivatization will likely be unsuitable for purposes of this invention. The polymer should provide the microparticle with a gel strength sufficient to preserve the structural integrity of the microparticle when it collides with the collecting surface 20 and also when it is packed in a column to perform gel chromatography.

When the composition is sprayed, as described below, it should generally be at least about 10° C. above the dynamic gelling temperature of the polymer. The standard method for measuring dynamic gelling temperature is to gradually lower the temperature of the fully-dissolved polymer (at about 1.5% w/v) in a test tube containing a thermometer. The thermometer is periodically removed to determine if the composition will flow to fill the hole left by the thermometer. The temperature at which the walls of the thermometer hole are retained in its absence is the dynamic gelling temperature of that polymer. Since gelation is a thermodynamic process, it has also been observed that gelation will occur over time at a constant temperature about 5° C. to 10° C. above its dynamic gelling temperature. This is referred to as the static gelling temperature. It is not generally known that the dynamic gelling temperature will increase for any given polymer type as its concentration is increased. When thermally-gelling polymers having different gelling temperatures are mixed, their composite gelling temperature is an additive property based on their relative proportions in the mixture.

Commercially-important thermally-gelling polysaccharide extracts from the seaweed family, Rhodophyceae, or red algae, consist primarily of agars, agaroses, carrageenans and furcellerans. An extracellular polysaccharide, Gellan®, obtained by the aerobic fermentation of *Pseudomonas elodea* is also a thermally-gelling polysaccharide. The food and industrial utility of these extracts is based, in part, on their ability to form gels at low concentrations ranging from as low as from about 0.1% to about 10% w/v. A second valuable property of the extracts is their thermal hysteresis, which means that once thermally gelled at about 30° C. to about 50° C., depending on the polymer, the gel will not remelt until it has been heated to about 90° C. to about 100° C.

Further, non-gelling polymers or proteins can also be included in the composition. Examples include carboxymethyl cellulose, alginate, gum arabic and arabinogalactin. Non-gelling polymers or proteins, such as those listed, can be entrapped in the gel matrix and subsequently cross-linked with the matrix or simply retained by steric inhibition to diffusion. The inclusion of suitable non-gelling polymers can provide the matrix with components that are valuable for performing ion-exchange and affinity chromatography. The inclusion of such polymers is much easier with this invention than it is with conventional micro-emulsion techniques because the inclusion of additional components affects the character of the emulsion and the effectiveness of emulsifiers used therewith. The incorporation of non-gelling components is less disruptive in this invention because the microparticles are gelled in air, and, consequently, do not require the use of an emulsifier.

The composition is pumped by pump 18 from the reservoir 12 through the conduit 14. The pressure driving the composition is preferably between about 75 and about 150 pounds (force) per square inch gage (psig) or about 5.2 to about 10.35 barg. The composition is then forced through the airless nozzle 16. Unlike air-atomizing systems, an airless nozzle atomizes the composition without injecting air into the sol. Suitable airless nozzles include, but are not limited to, manual, piston driven, piezoelectric, pin jet, hollow cone and full cone nozzles. Standard consumer sprayers (such as hand-held spray bottles or electric paint sprayers) can be used to form polymer microparticles in accordance with this method. Each of the above-listed nozzles stands in contrast with the air-atomizing nozzle disclosed in U.S. Pat. No. 5,662,840, issued to Thomas et al., which injects a stream of gas into the composition to atomize the composition. The injection and corollary entrapment of air is undesirable because the resultant air bubbles supply the microparticles with a buoyancy that is detrimental to their use in standard column chromatography techniques.

Figure 2:
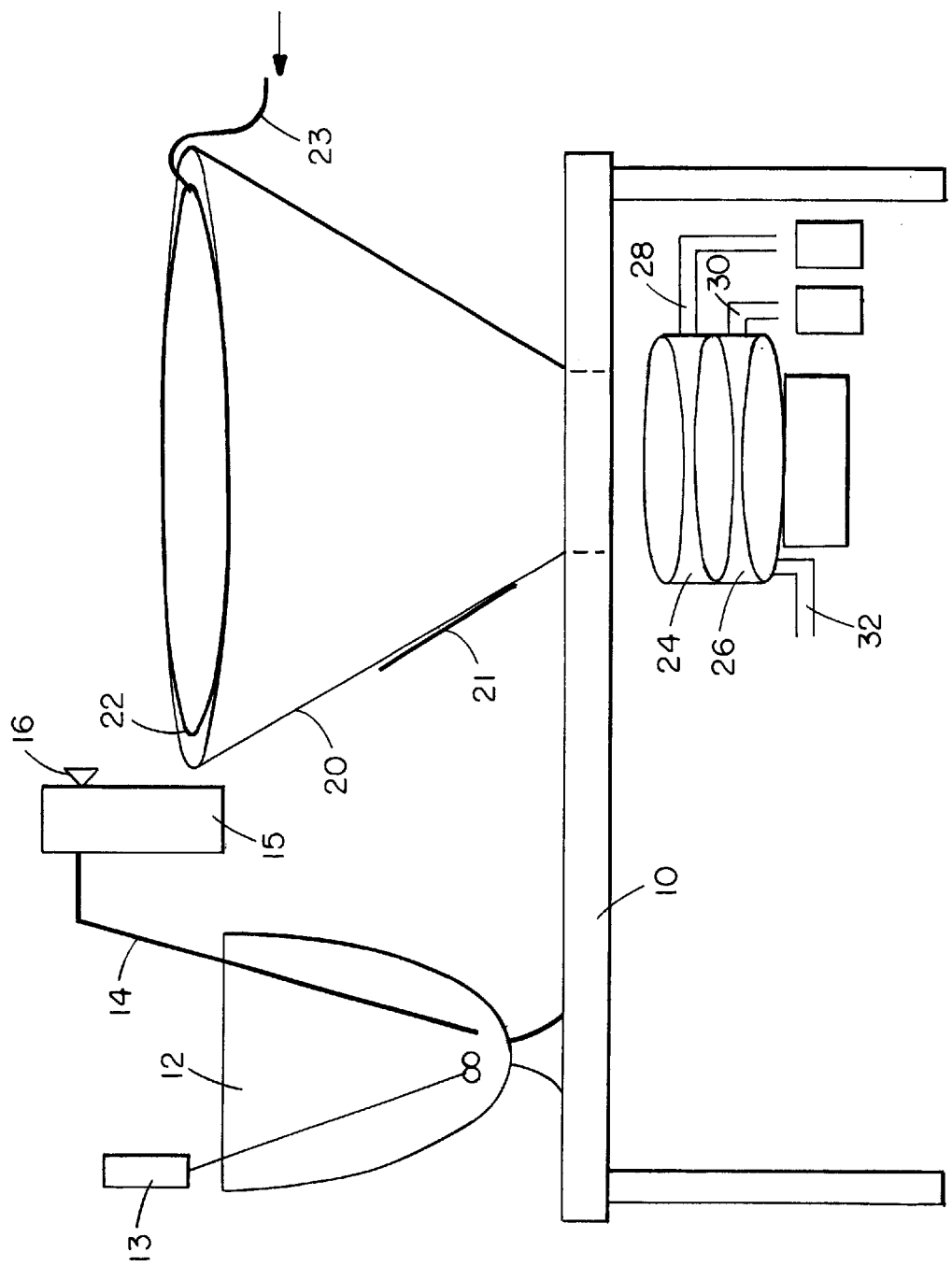
Figure 3:
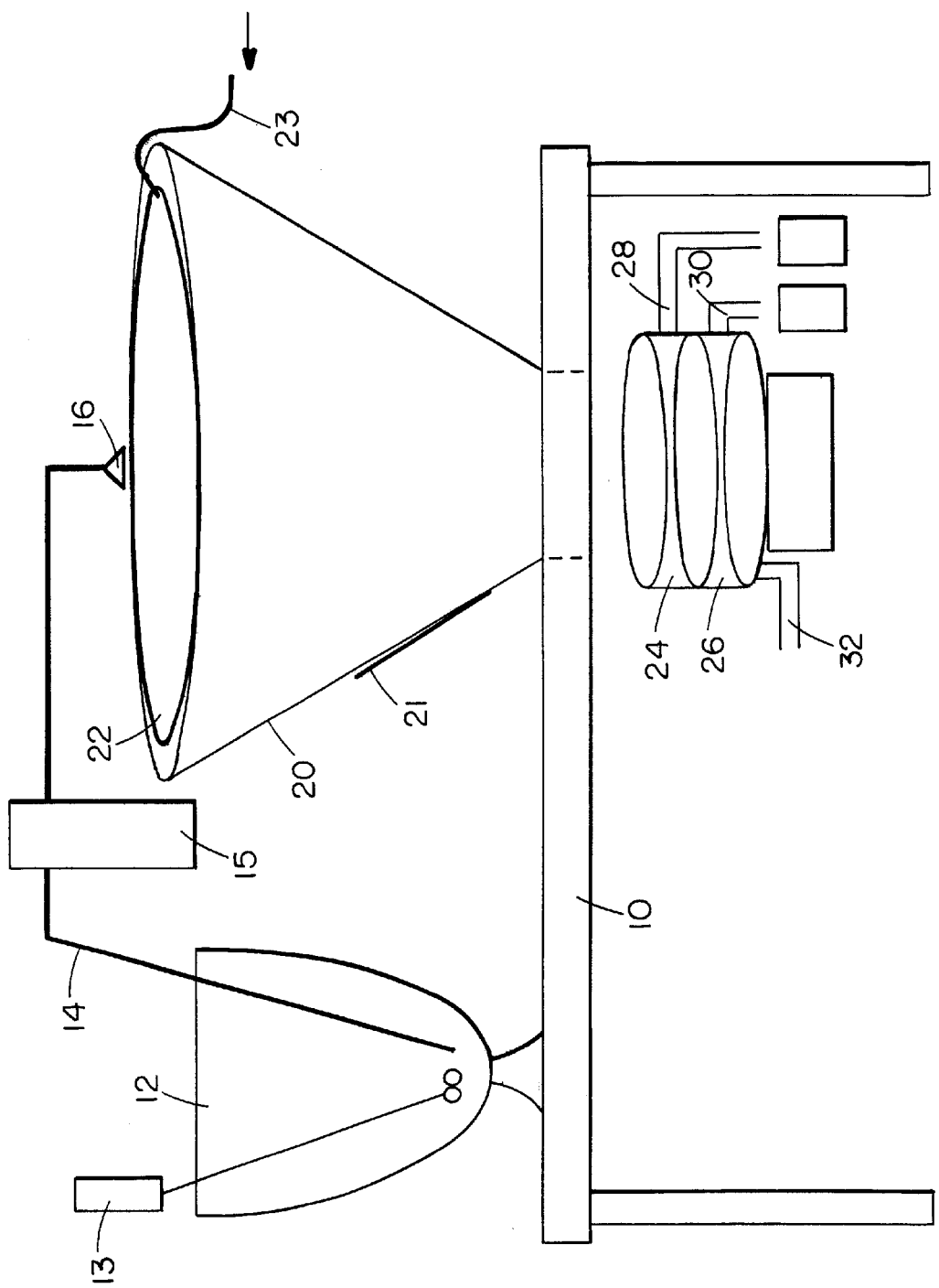

The atomized composition is sprayed from the nozzle 16 into ambient air as a fine mist. As shown in FIG. 1, the nozzle 16 can be positioned within the basin formed by the collection surface 20 and directed upward to generate spray in the form of a hollow cone with a spray angle of at least 30° (e.g., wherein the angle between the axis of the cone and the wall of the cone is at least 15°), with the shape of the cone being determined by the shape of the nozzle 16. Preferably the spray angle is between about 120° and about 180° A nozzle producing a hollow cone is preferred to prevent particles from being directed straight up, in which case they will either collide with one another or with the nozzle upon return. In this embodiment, the atomized composition will arc upward (above the horizontal plane of the nozzle 16) and fall under the force of gravity. Alternatively, the nozzle can be directed laterally or downward, as shown in FIGS. 2 and 3, respectively, in which cases, the sprayed mist can take the form of a full or hollow cone. The ambient air into which the composition is sprayed is neither heated nor cooled and will generally have a temperature between about 15° C. and about 40° C.

The size of the sprayed droplets (and the consequent size of the gelled microparticles) can be decreased by increasing the pump-induced pressure, the temperature of the nozzle 16, and/or the temperature of the composition. The higher the gelling polysaccharide concentration, the higher the viscosity of the composition at any given temperature and, hence, the higher the temperature and/or pressure the mix must be sprayed at to obtain a desired size distribution of microparticles. Preferably, the viscosity of the composition is less than 300 centipoise (cps) at about 90° C. If the size of the microparticles is still too great at the maximum temperature and pressure for the available equipment, microparticle size can be reduced by reducing the viscosity of the thermally-gelling polymer by molecular weight reduction.

Further, the flow rate at the nozzle 16 can be adjusted to reduce post-spray collisions involving atomized droplets and gelled microparticles. Regardless of the angle and direction chosen, it is found that the smallest droplets gel quickest and, once gelled, are most retarded by air resistance due to their higher surface area per unit volume in comparison to larger beads, which have a higher average velocity. As a result, larger, still-molten beads can overtake and envelop smaller gelled beads as spherical inclusions.

Nevertheless, it was found that a limited occurrence of microparticle inclusions, which invariably occur with most spray (and emulsion) processes, does not significantly affect microparticle performance since the entrained microparticles have the same porosity as the surrounding microparticle. Moreover, the occurrence of occasional microparticle "craters" resulting from post-spray collisions does not materially affect the void space of a packed column (i.e., more than random changes in size distribution that have been tolerated for years).

Pulsed spraying, wherein the composition is sprayed through the nozzle in pulses, is used to minimize both bead inclusion and crater artifacts without having a large impact on throughput. The pulses can be generated by the repetitive firing of a single nozzle or by the sequential firing of a plurality of nozzles, which, for example, can be positioned around the circumference of a collection basin. The atomized composition thermally gels to form microparticles in the air within a second or two of leaving the nozzle(s). Accordingly, the pulses are typically sequenced at 1 or 2 second intervals when the spray is directed upward to allow the particles to gel and fall out of the spray cone. Alternatively, when the spray is directed downward, the pulses are preferably more rapidly sequenced, with a frequency of about 1 pulse/second, which is usually sufficient to allow the microparticles from each pulse to fall out of the cone.

The ability to form polymer microparticles having a well-ordered and uniform gel structure with such a short gelling period is unexpected because the regularity of the gelled structure usually decreases with increasing gelling rates. Surprisingly, with this invention, microparticles having uniform microstructure can be formed at very fast gelling rates. Known methods for forming gel chromatography media typically require much longer gelling rates.

The gelled microparticles have a solids content (which includes the thermally-gelling polymer as well as non-gelling polymers) between about 0.5% and about 50%, with the preferred concentration being highly dependent on the application for which the microparticles are intended. The microparticles are shaped as monomorphic (non-clustered) spheres with diameters between 50 micrometers and 500 micrometers. Moreover, the microparticles are substantially free of air bubbles, in part, because an airless spray nozzle is used. Further, and in contrast to the microparticle-forming process described in U.S. Pat. No. 5,053,332, issued to Cook et al., the atomized composition of this invention can be gelled at ambient temperature due to its higher gelling temperature. By performing this process at ambient temperatures, production costs are lowered as a consequence of eliminating the need for active cooling.

Microparticles used for low-pressure gel diffusion chromatography preferably have diameters between about 50 micrometers and about 180 micrometers. On the other hand, microparticles used for industrial-scale affinity chromatography preferably have diameters in the range of from about 180 to about 250 micrometers, and microparticles used for cell affinity chromatography will preferably have diameters greater than about 250 micrometers.

After gelling quickly in air, the microparticles fall onto a sloped collection surface 20 positioned far enough from the sprayer nozzle 16 so that the microparticles have sufficient time to achieve a gel strength sufficient to mitigate against fusing or splattering of microparticles when the microparticles reach the collection surface 20. Along the top rim of the collection surface 20 is a trickle ring 22. The trickle ring 22 supplies a thin film of water flowing down the collection surface 20, reducing capillary adhesion of the microparticles to the collection surface 20 and, thereby, enhancing transport of the microparticles across the collection surface 20 to the screens 24, 26.

Figure 4:
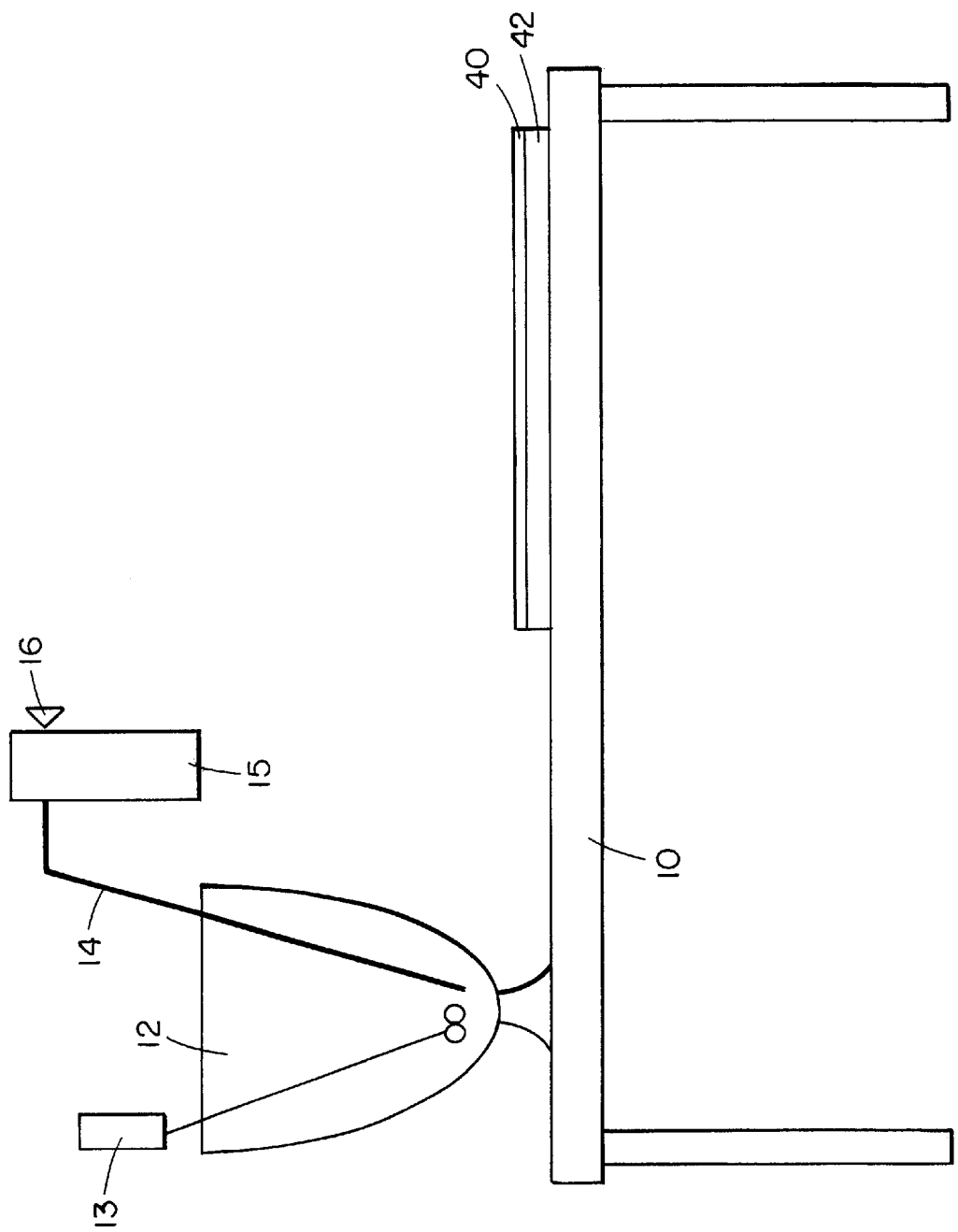

Alternatively, as shown in FIG. 4, the gelled microparticles can be collected in a shallow basin 40 filled with water 42 including a surfactant to reduce surface tension. The basin 40 of water 42 helps to prevent irreversible dehydration of the microparticles. Preferred surfactants are liquids at 25° C. and have a hydrophilic/lipophilic balance (HLB) in the range from about 12 to about 20, preferably 16. Another preferred surfactant is Triton®-X-100, a relatively low-molecular-weight surfactant. Regardless of the means for collection, the microparticles should be maintained in a wetted state, by spraying with water if necessary, because dehydration will render the microparticles unsuitable for performing gel chromatography.

Upon collection, the microparticles, in the form of a moist, high-solids slurry, are directed to vibrating screens 24, 26 using one or more of the following means of facilitation: air flow, vibration, or a water spray. The rate at which the microparticles are screened is substantially the same as the rate at which microparticles are produced because of the low or negligible volume of water needed for screening, thereby enabling a continuous production process. The screens that are used are selected by mesh size such that the selected mesh sizes will isolate those microparticles having diameters appropriate for a particular end use. Microparticles are removed via lines 28, 30, while the water from the slurry is discharged through line 32.

The microparticles are then suspended in distilled, de-ionized, reverse-osmosis (RO) water and stored in this form until they are used to perform gel diffusion chromatography.

EXPERIMENTAL

Various aspects of the invention will now be illustrated in the following examples. Unless specified otherwise, all of the following experiments were conducted at ambient temperature and humidity (i.e., 60–95° F. and 35–85% relative humidity). Pump fluid pressures are reported in psig, where 1 psig=0.069 barg.

EXAMPLE 1

Production of Agarose Microspheres with a Trigger-Pump Sprayer

An 18.6 gram quantity of Gracilaria-derived agarose, type D-2 (from Hispanagar of Villalonquejar, Burgos, Spain) was slowly added to 900 ml of cold, distilled water and then heated to boiling until thoroughly dissolved. The resultant 2% w/v agarose composition was incubated at 85° C. while the spray apparatus was prepared.

A Spraymaster® bottle (manufactured by Delta Industries, King of Prussia, Pa., USA) was filled with hot (90° C.) distilled water and the spray handle squeezed several times to thoroughly warm the nozzle. The adjustable nozzle tip was adjusted so that the finest spray was achieved with the water. Failure to pre-heat the bottle will result in gelation within the sprayer and will alter the claimed range of operation described herein.

Any surface film on the incubated 2% agarose composition was skimmed off and the balance of the molten composition was immediately transferred to the pre-heated spray bottle. Failure to skim any surface "skin" or to thoroughly dissolve the agarose was found to result in immediate nozzle plugging.

The sprayer was positioned five feet above a horizontal plastic surface. The spray handle was depressed rapidly, using about 2 kg of force, and the resultant laterally-directed solid cone spray was found to be roughly comparable to that produced with water (i.e., having an angle of about 35° C.). A fine mist of microparticles was thereby produced, and they fell within two seconds to the plastic collection surface. A total of 400 ml of agarose sol was sprayed. The balance of the sol was immediately transferred back to the 85° C. incubator vessel and the sprayer immediately flushed with 90° C. distilled water until no residual agarose remained.

The beads were deposited over a distance of about four feet from the point of spraying. A 200 ml sample of the beads were collected and a 35 g aliquot was screened over the following stacked set of screens (top to bottom): 40 mesh (425 μm), 60 mesh (250 μm), 80 mesh (180 μm), and 325 mesh (45 μm). The fractionation results are shown in the Table 1 below.

TABLE 1

| Screen Mesh | Bead Size (μm) | % Total Beads | Microscopic Appearance |
|---|---|---|---|
| 40 | >425 | 1.9 | Large, spherical beads; some fused; some air bubbles |
| 60 | 250–425 | 15 | Spherical beads with some "craters" & inclusions |
| 80 | 180–250 | 30 | Spherical beads, some craters, rare fused beads |
| 325 | 45–180 | 57 | Spherical beads, some craters, rare fused beads & air |

EXAMPLE 2

Agarose Microsphere Production Using Finger-Pressure Spray Bottles

A 2% w/v Gracilaria-derived agarose sol was prepared according to Example 1 and incubated at 85° C.

A hydraulic spray bottle designed to dispense a liquid, zero-calorie type of margarine (I Can't Believe It's Not Butter®) was filled full with 250 ml of hot (85° C.) distilled water and sprayed several times to warm the spray nozzle.

The hot agarose sol was immediately transferred to the warmed bottle and the finger-pressure pump repeatedly depressed at a height of 5 feet above a horizontal sheet of plastic. The solid-cone spray pattern observed had a spray angle of about 25°. The resultant mist of beads fell to the plastic surface within 1–2 seconds. After about half of the agarose was sprayed, the remainder was transferred to a typical, hair conditioner spray bottle (Kerasilk®), which was both preheated and sprayed in the above manner. The resulting solid-cone pattern and angle (~20°) was similar to the previous spray bottle. The bead size distribution was somewhat smaller, however, and contained the same type of crater and inclusion artifacts.

The beads were collected from the plastic collection surface using a wide spatula and placed in water to prevent dehydration. About 50% of the beads floated despite the fact that microscopic examination revealed that only about 30% of the floating beads contained air bubbles. After overnight standing and gentle agitation, more than 75% of the total beads had settled. Gross microscopic examination of the settled beads revealed that most of them had sizes between 45–150 μm and were essentially spherical. The bead size and morphology distributions for both spray bottles are shown in Tables 2 and 3, below.

TABLE 2

Spray Margarine Bottle #1

| Bead Size (μm) | % of Total Bead | Microscopic Examination |
|---|---|---|
| >425 | 0.1 | not examined |
| 250–425 | 3.0 | Mostly spherical beads, typically with 1–3 bead inclusions but no clusters or diads. |
| 180–250 | 28 | Spherical beads but many contain 1–3 bead inclusions also some cratering. |
| 45–180 | 68 | Spherical beads but often contain craters, or dents; about 30% have small spherical bead inclusions. |

TABLE 3

Hair–Spray Bottle #2

| Bead Size (μm) | % of Total Bead | Microscopic Examination |
|---|---|---|
| >425 | 0.3 | — |
| 250–425 | 0.3 | — |
| 180–250 | 0.3 | — |
| 45–180 | 93 | About 40% are perfect spheres, about 40% are spherical with one or more craters and 20% are spherical but "dented" or partially flattened on one side. |

EXAMPLE 3

Agarose Bead Production using an Electronically-Driven Oscillating Nozzle

One liter of a 1% w/v D-2 Gracillaria-derived agarose sol was prepared in the manner described above and incubated at 85° C. About 400 ml of hot (85° C.) distilled water was used to preheat the 500 ml "paint" reservoir of a Wagner0 200 series Power Sprayer (Wagner Spray Tech Corp., Minneapolis, Minn., USA) and spray about 250 ml (i.e., 1 minute) of the hot water through the spray nozzle to thoroughly pre-heat the nozzle. Immediately, 400 ml of the 1% D-2 agarose sol was transferred to the reservoir and sprayed laterally at a height of 5 feet over a large, horizontal sheet of plastic. The sprayed agarose immediately became a white cloud or fog of beads which extended about 7 feet from the nozzle (at an approximately 60° spray angle) and was about 2 feet wide at its maximum width. After spraying, the balance of the agarose was removed from the sprayer and the latter flushed with hot water as above.

Aliquots of the beads were immediately collected from the plastic collection surface, screened and examined under a light microscope to determine bead size and morphology.

TABLE 4

| Bead Size (μm) | % of Total Bead | Microscopic Examination |
|---|---|---|
| >425 | 3 | Huge "grape clusters" of smaller beads & masses |
| 250–425 | 21 | "Grape clusters", no large spherical beads |
| 180–250 | 12 | Smaller "grape clusters" and aggregates |
| 45–180 | 64 | About 40% are spherical, 20% oval, 10% rectangular and the balance various shapes. Few fused beads. Many beads have crater or inclusion artifacts. |

EXAMPLE 4

Determining the Minimum Spray Distance for Sprayers of the Wagner® Type

Using a 2% agarose sol prepared according to Example 1, a Wagner® Power Sprayer was equipped with a blue tip (orifice: 0.019 inches) and the spray adjustment knob turned ½-full-rotation clockwise. Under these conditions, the hot (75° C.) sol was sprayed at about a 70° angle (i.e., 200 from orthogonal) onto a horizontal sheet of plastic divided into 2-feet×2-feet sectors. About 100 ml of the composition was sprayed in each sector at the heights indicated in Table 5. After about 5 minutes, aliquots of the product deposited in each sector were examined under the microscope.

TABLE 5

| Distance Between Sprayer And Plastic Surface | Product Microstructure |
|---|---|
| 6 inches | Fused sheet with faint bead boundaries |
| 1 foot | Fused sheet with imbedded, fused beads |
| 3 feet | "Grape clusters" of beads; no fused sheet |
| 5 feet | About 30% individual, spherical beads, 40% diads or triads and 30% grape clusters |
| 7 feet | More than 70% are individual, spherical beads and the balance are diads or multiples. |

EXAMPLE 5

Spray Temperature Selection Based on Gel Temperature

The spray temperature should be at least about 10° C. above the "dynamic gelling temperature" of the sprayed mix The larger the distance between the spray temperature and gelling temperature, the longer the aerial gelling time and aerial distance the beads must travel before having sufficient gel strength to impact a surface (fluid or solid). Since the sprayed temperature affects sprayed viscosity, it also affects atomization. The closer the spray temperature is to the mix's gelling temperature, the higher the relative mix viscosity and the larger the atomized droplets are likely to be. These findings were illustrated in the following tests with the Spraymaster® sprayer according to the method of Example 1:

TABLE 6

| Agarose Type | Conc | GT | Spray Temp | Dist. to Surface | Microscopic Results |
|---|---|---|---|---|---|
| D-1 | 2% | 37 | 50 | 4.5 feet | Many fused, coarse beads |
| | | | 70 | " | Spherical, single beads |
| | | | 90 | " | Spherical, single beads |
| D-2 | 2% | 42 | 50 | 4.5 feet | large, coarse aggregates |
| | | | 70 | " | Spherical, single beads |
| | | | 90 | " | Spherical, single beads |

TABLE 6-continued

| Agarose Type | Conc | GT | Spray Temp | Dist. to Surface | Microscopic Results |
|---|---|---|---|---|---|
| Seaplaque ® | 2% | 28 | 40 | 4.5 feet | Individual, soft beads |
|  |  |  | 60 | " | Most fused beads |
|  | 4% | 30 | 70 | " | All fused beads |
|  |  |  | 40 | " | Individual, spherical beads |
|  |  |  | 60 | " | Most single beads |
|  |  |  | 70 | " | Most fused beads |

In Table 6, above, D-1 is a Gelidium-derived agrose from Hispangar, and, as noted above, D-2 is Gracilaria-derived agarose, also from Hispangar. Seaplaque® is from FMC Corporation (Philadelphia, Pa., USA).

EXAMPLE 6
Effect of Pulsed Sprays and Mixed Sprays on Bead Artifacts

To determine the effect of post-spray aerial droplet and bead collisions, various sprayers were both pulsed and operated continuously with and without sprayer movement between pulses. A 2% agarose sol, like that described in Example 1, was used in all tests along with horizontal piece of plastic which had been divided into 3 sectors, each 3×3 feet.

Single pulsed sprays were performed in each sector and the beads thus produced allowed to settle on the plastic (1–3 seconds) without having contact with other bead pulses. The colliding sequential pulses were formed by spraying the first pulse upward at about a 450 angle (about 5 feet above the plastic but arcing to about 6–7 feet) and spraying the second pulse into the beads from the first pulse as they settled (1 second later). Individual pulses were sprayed rapidly in separate sectors to compare the results with pulses sprayed rapidly in the same sector.

TABLE 7

| Sprayer | Continuous (C) | Single Pulse (SP) | Colliding Sequential Pulses (CSP) |
|---|---|---|---|
| Example 2: bottle #2 | not applicable | fewer fused beads and craters than Example 2 | Much higher incidence of inclusions, craters, and fused beads |
| Wagner ® PS | more fused beads than with SP | Fewest fused beads & artifacts vs. C & CSP | higher incidence of fused beads than C |

TABLE 8

| Single Pulsed Spray in Each Sector Sequentially | | | |
|---|---|---|---|
| Sprayer | Sector #1 | Sector #2 | Sector #3 |
| Example 1: Spraymaster ® | Fewer crater and inclusion artifacts than Example 1 | Same as Sector 1 | Same as Sectors 1 & 2 |
| Wagner ® | Fewer crater and inclusion artifacts than in Example 3 | Same as Sector 1 | Same as Sectors 1 & 2 |

EXAMPLE 7

Surfactant Selection to Improve Bead Geometry

For low-concentration agarose beads (less than 2%) or those known to be prone to dehydration artifacts (less than 4%), sprayed beads were collected in cold water containing a surfactant instead of on a solid surface. Using 2% agarose (Example 1), the bottle #1 sprayer of Example 2, a horizontal sprayer orientation, and a spraying distance of about 3 feet, various shallow pans (10×13 inch) filled with at least 500 ml of water or water plus surfactant, were used as collection vessels for the sprayed beads. This experiment was repeated under optimal conditions using 0.2% Brij® 700 in water as the collection vessel for 0.5% agarose beads which could not have been prepared without deformation and dehydration on a solid surface. No significant dilution of the agarose concentration was noted following contact with the cold, low-surface-tension water immediately after bead formation.

TABLE 9

| Trial # | Surfactant (0.2%) | Microscopic Results |
|---|---|---|
| 1. | none | fused agarose sheet on surface of water |
| 2. | polyethylene glycol 600 | same as #1 above |
| 3. | Brij ® 700 (HLB 18) | no skin; beads are spherical; 90% in the 50–180 micron range |
| 4. | Tween ® 20 (HLB 16) | no skin; beads are spherical; most are 50–250 micron range |
| 5. | Myij ® 52 (HLB 16) | no skin; beads are generally spherical; most in 50–250 micron range |
| 6. | Tween ® 85 (HLB 11) | bead "strings" on and below water surface; many free beads |
| 7. | glycerol monolaurate (HLB 9) | mottled, discontinuous skin on surface |
| 8. | Span ® 80 (HLB 4) | mottled skin on surface; some aggregates below |
| 9. | Commercial dish soap | gel sheets below the surface |

EXAMPLE 8

Effect of Air Entrainment on Bead Functionality

Unwanted air bubbles were trapped within beads using each of the following pumping or spraying methods: direct air pressure, agarose sol aeration, and air atomization nozzles. See other examples for details. When the bubbles were sufficiently large, the beads would float in water thereby making the beads unsuitable for their intended use in conventional column chromatography techniques because the beads would not settle with the other beads to form the gel bed within the column, leading to voids and other column artifacts.

Beads containing air bubbles were readily removed from crude aqueous slurries of beads and from screened beads which were collected in water by allowing the beads to stand for about 30 minutes with gentle surface agitation to dislodge entrained beads which have no air bubbles but which were trapped with the "floaters." The floating bead layer can then be removed by either decantation or aspiration and the agarose recovered by standard means.

In another application of this invention, it was found that the incorporation of air into beads could be turned into an advantage if the air could be uniformly distributed as small air bubbles (e.g., with diameters less than one-quarter of the bead diameters), as in risen bread. With other methods, beads are usually rendered unsuitable for gel chromatography by the inclusion of air bubbles. However, with methods of this invention, suitable beads containing air bubbles can be produced if the air bubbles are stabilized within the sol by an emulsifier before spraying, as opposed to being physically trapped in the sol during spraying. While the generation of air bubbles while spraying with an air-atomizing technique will generally produce a skinning effect on the beads due to the dehydration thereby induced, the incorporation of small, well-dispersed air bubbles into the sol before spraying can be performed without causing significant damage to the sprayed beads. Accordingly, a microparticle formed by this technique will have an exclusion limit that is substantially unchanged from that of a microparticle from which air bubbles are excluded. Generally, a sufficient number of air bubbles should be evenly distributed throughout the sprayed microparticles to allow the subsequently-gelled microparticle to float, allowing use, as directed, below.

For example, 2 liters of a 2% solution of D-2 agarose was prepared in the standard manner and divided into 500 ml portions which were maintained at 85° C. Portion #1 was the control. Portion #2 contained 2% (w/v) Myvacet@, an acetylated monoglyceride emulsifier. Portion #3 contained 2% (w/v) Myvacet® and 2% (w/v) powdered milk solids. Portion #4 contained 2% (w/v) Atmul® 80 (ICI; Wilmington, Del., USA) an oleate/palmitate emulsifier having an HLB of about 2–4. Each was vigorously aerated with a Braun® homogenizer, held near the surface of the liquid to entrain air into the mix. Immediately after homogenizing, each portion was laterally sprayed with a Spraymaster® sprayer about 3 feet above a plastic surface. Each product was collected and examined microscopically for the incidence of air bubbles. The relative incidence of air in the beads, in descending order, was: portion #4, portion #3, portion #2, and portion #1. In addition, the air bubbles in portions #2, #3 and #4 were smaller than in the control portion (#1). About 80-90% of the beads in portions #2, #3 and #4 were found to float in water and in 50% isopropanol.

A new approach to the use of affinity chromatography is suggested by the above method of making floating agarose beads. Namely, the elimination of high pressure to force liquid through a packed bed of conventional, non-aerated beads in a column. Instead, one can simply mix aerated, ligand-containing beads into the liquid to be processed, followed by later removal by simple decantation (because the beads float). Another approach with much the same objective has been to use magnetic beads which could then be recovered without subjecting the beads to slow, high-pressure column filtration. The use of air to achieve a similar result is much more expedient, however.

EXAMPLE 9
Screening Hollow-Cone Nozzle Efficacy

An 11-liter batch of agarose D-2 was prepared in the manner described in Example 1. The molten sol was transferred to a 20-liter pressure tank (from Spray Systems Inc., Wheaton, Ill., USA) equipped with an electric heater band set from 60–85° C. and the tank pressurized at 90 pounds (force) per square inch (psi). The tank was connected to a nozzle using about 3 feet of ¼-inch-diameter copper tubing which was maintained between 75–85° C. with heating tape. The nozzle was positioned about 1 foot above a horizontal sheet of plastic. The nozzle faced upwards, although the fluid stream exited in a shallow arc to the side of the nozzle when the atomization conditions were properly adjusted.

A series of nozzles were screened which were known to produce hollow-cone, fine-mist spray patterns with water and had the capability to produce commercial-scale quantities (greater than about 0.5 L/min) under those conditions. In general, they were found to produce higher flow rates and different spray angles with the sol than with water at comparable pressures. When the spray angle was as wide or wider than that formed with water, atomization was adequate to achieve the desired bead-size distribution for chromatography beads. The lateral trajectory of the widest sprays did not exceed 5 feet from the nozzle (i.e., bead deposition occurred within a 10-foot-diameter circle with the nozzle at the center). When a hollow-cone pattern was not achievable or was very narrow, it was inferred that this could be corrected with nozzles of this type by either using lower-viscosity agarose, reducing the agarose concentration, and/or raising the pressure. The latter could not be tested in these trials due to the limitations of the tank and air compressor available.

When a given series of tests was concluded, a water flush of the tank and line was conducted with preheated 85° C. water until no evidence of residual agarose was found.

TABLE 10

| Nozzle | | | | | Bead Product Geometry And |
| --- | --- | --- | --- | --- | --- |
| Type | Mfr. | Category | Spray Angle | Flow Angle | Size Distribution |
| TTX-4W | SSCo | Hollow cone; in-line, whirl tangential | 155° | 0.6 Lpm | generally spherical with some craters; 50–400 $\mu$m. |
| TT D 1.5 | SSCo | as above | 25° | ~0.5 Lpm | heavily cratered spheres; bimodal distribution. |
| AASSTC-1 | SSCo | as above | straight jet (<10°) | ~0.5 Lpm | no useful beads or product. |
| WT10-70 | SSCo | as above except traditional right angle inlet -- not in-line | (<10°) | ~0.5 Lpm | no useful beads or product. |

In the Tables, above and below, "SSCo" refers to Spray Systems, Inc.

EXAMPLE 10
Air-Atomizing vs Hollow-Cone Nozzles

The same equipment and protocol were used here as in Example 9, including the same type of agarose (i.e., HGT, high gelling temperature), but obtained from another supplier (FMC Corp.). As before, it was dissolved at 4% and once dissolved, it was found to have a significantly higher viscosity. Hence, the spray pattern obtained with repeating nozzle TTX-4W was found to be narrower, and the bead product exhibited a higher incidence of very large (600 $\mu$m) cratered and fused beads. By contrast, the prototype air-atomizing nozzle yielded a better particle size distribution but with a much higher incidence of entrained air bubbles under these conditions. In addition, the beads made with the air-atomizing nozzles had surfaces which were partially dehydrated by the high air flow on the nascent bead surfaces thereby causing porosity artifacts.

TABLE 11

| Nozzle | | | | | Bead Product Geometry And |
| --- | --- | --- | --- | --- | --- |
| Type | Mfr. | Category | Spray Angle | Flow Angle | Size Distribution |
| TTX-4W | SSCo | hollow cone; in-line; whirl tangential | 30° | ~0.5 Lpm | very large (600 $\mu$m) beads, more craters than before; more fused beads |
| XAX | SRI | air atomizing; external mix; spiral liquid impingement | 35° | ~0.5 Lpm | 45–250 bead size range but high incidence of fused beads |

In the Tables, above and below, "SRI" refers to Spray Research, Inc. (Turner Falls, Mass., USA).

To further compare air-atomizing and hollow-cone nozzles, especially at high viscosity, a 6% agarose sol was prepared with low-gelling-temperature (LGT) agarose. Acceptable product was not obtained with either the TTX-4W reference nozzle or the air-atomizing nozzles due to entrained air within the beads.

TABLE 12

| Nozzle | | | | | Bead Product Geometry And |
| --- | --- | --- | --- | --- | --- |
| Type | Mfr. | Category | Spray Angle | Flow Angle | Size Distribution |
| XAAD-FC1-AC-1603 | SRI | air atomizing; internal mix; coaxial | 45° | <0.5 Lpm | virtually all fused beads |
| TTX-4W | SSCo | (as above) | 10° straight jet (<10°) | <0.5 Lpm | all fused bead |
| XAXW-FC8-AC-1401 | SRI | air atomizing; coaxial mix | | unknown | no usable beads |

EXAMPLE 11

Scaled-up Sprayed Bead Production

To a 230-liter-capacity, jacketed, stainless-steel kettle was added 150 liters of cold, filtered tap water followed by 6 kg of D-2 agarose. The water and agarose were then slowly mixed using a VariMix® mixer (from Lightnin of Rochester, N.Y., USA). Boiling water was pumped through the jacket until the agarose slurry had been brought to a boil and the agarose thoroughly dissolved. The resultant 4% (w/v) agarose sol was then cooled to 75° C. and pumped (140–150 psig) to a TTX-4W nozzle using an improvised HydraCell™ pump (from Wanner Engineering, Inc. of Minneapolis, Minn., USA) which had a splitter that allowed about 80% of the pumping capacity to be sent to the tank through about 8 feet of thermostated (75–85° C.), ¼-inch-diameter copper tubing and the balance recycled to the tank, resulting in some aeration.

The sprayed beads were collected on a specially-constructed, downwardly-sloped (45°) plastic surface surrounding the nozzle. This sloped surface was in the form of a cone having 8 sides or faces and resembling a "gazebo" with the nozzle at the apex. At the lower edge of the sloped surface was a ring of plastic containers (15 gallons) to collect the product. To facilitate drainage of the bead slurry down the plastic, a circular plastic trickle ring was configured at a distance of about 6 inches from the nozzle. The trickle ring produced a fine water spray (approx. 1 gallon/minute) that helped move the bead slurry down the plastic surface and into the collection containers.

A total of 125 liters of beads were sprayed and collected in plastic 5-gallon and 15-gallon containers as wet slurries.

EXAMPLE 12

Size Classification of Beads using Hydraulic-Spray-Assisted Screening

A set of three circular, 48-inch diameter screens were stacked (60 mesh, top; 80 mesh, middle; and 325 mesh, bottom) such that there was a 1-foot clearance between screens. Composite aliquot bead slurries from Example 10 were added to the top screen and subjected to a cone-shaped water hose spray (flow=~5 gallons/minute; pressure=~70 psi) to facilitate size classification. The water nozzle was directed to within inches of each portion of the screens to hasten the passage of small beads through the screens. Microscopic examination of the beads revealed that there was no change in bead morphology as a result of this treatment.

It was found that a 70% bead solids slurry in water was barely pourable after gentle stirring. Without constant, gentle stirring with a blunt stirrer, the beads would immediately settle out. In order to have a slurry consistency which was conveniently pumpable to the screens, the beads solids had to be diluted to about 25% by volume with water. Even then, agitation had to be maintained in the bead slurry holding tank in order for the pump to continue pumping. This required an undesirable amount of space and time to effect. In addition, despite these precautions, pumping-induced bead attrition was observed in the final product.

The best rate of size classification, using this wet screening method was about 1 liter of settled beads over 15 minutes or about 65 ml of beads/minute

EXAMPLE 13

Size Classification of Wet Beads using a Vibrating Screen

A circular 24-inch diameter Vibro-Energy® separator (from Sweco of Florence, Ky., USA) was used to size fractionate a composite bead aliquot (2 L of beads as a 50% slurry in water) from Example 10. Two stacked screens equivalent to 80 mesh (bottom) and 60 mesh (top) were placed on the unit. The slurry was introduced to the center of the vibrating top screen, and beads larger than 60 mesh were vibrated to the edge of the screen and moved into a +60 mesh (i.e., +250 μm diam.) collection bucket. The rest of the beads fell through the 60-mesh screen to the 80-mesh screen and either passed through as primary product (45–180 μm diam.) beads and were collected or remained on the 80-mesh screen and rotated into a +80 mesh (180–250 μm) collection bucket.

The rate of passage through each screen was about 250 ml of settled beads per minute or about 0.5 ml of settled beads/(in.$^2$·min.). It was noted that the 50% solids slurry of beads was substantially dewatered on the top screen, leaving a bead mass which tended to retain a fair amount of interstitial water, presumably by capillary forces. This interstitial water was inferred to slow down bead-size fractionation because it had the effect of clumping adjacent beads rather than allowing them to vibrate freely on the screen.

Microscopic examination of the beads before and after this method of size classification confirmed that there was no bead attrition or change in bead morphology.

One potentially better screening process was envisioned, during this test, whereby the beads would be screened in a semi-dry state and no additional water would be added, thereby possibly minimizing or obviating bead clumping and its associated slowing of the classification process.

The second alternative was to assist sieving with a direct spray of water, thereby combining the hydraulic sieving and vibro-energy assisted sieving methods, described above.

EXAMPLE 14

Collection Surface Material Selection

If beads are to be collected, semi-dry, on a solid surface immediately after being sprayed as a hot, molten sol, the optimum surface type and shape has to be selected. Such a surface would have to minimize adhesion to the nascent beads and impart no unacceptable organic substances to the beads as a result of contact. In addition, the shape of the surface should serve to convey the newly-formed beads to a size classification screen without compromising the delicate integrity of the beads.

Potential surface-material candidates were evaluated using the following test protocol:

1) An 8×12 inch sheet of each material was clipped to a clipboard and tared on a top loading balance.
2) A 0.3 g drop of water or test bead slurry is placed on the surface and the contact angle measured.

3) One end of the board is raised while the other is kept fixed.
4) The angle at which the water drop or bead deposit is found to slide or roll down the plastic surface is noted using a protractor. This is referred to as the "minimum sliding angle."

Tables 13a and 13b compare various surface candidates according to the above test protocol.

TABLE 13a

Test Fluid: Water

| Material | Contact Angle | Min. "Sliding" Angle | Comments |
|---|---|---|---|
| stainless steel(SS) | 60° | 20° | moderately hydrophobic |
| polyethylene(PE) | 80° | 15° | very hydrophobic |
| polypropylene(PP) | 80° | 20° | very hydrophobic |
| glass(G) | 30° | 10° | hydrophilic |
| polyethylene-pterphthate (PET) | 80° | 25° | very hydrophobic |
| Gelbond ® plastic | 35° | 10° | hydrophilic |
| waxed paper | 85° | 5° | very hydrophobic |
| PP + 1.7% Triton X-100 | 20° | 10° | very hydrophilic |
| PP + 2% urea | 6° | 15° | moderately hydrophobic |
| PP + polysilicone* | 8° | 15° | very hydrophobic |

*CRC Industrial Food Grade Silicone Lubricant

TABLE 13b

Test Fluid: Bead Slurry

| Material | Slurry % Beads* | Minimum "Sliding" Angle |
|---|---|---|
| polypropylene (PP) | nascent beads (100%) | None: will not slide - even at 90° |
| polypropylene (PP) | 90–100% | None: will not slide at 90° |
| polypropylene (PP) | 80% | Slides with slight deposition "trail" at 20° angle |
| polypropylene (PP) | 50% | 20° slides without deposition |
| glass(G) | nascent beads (100%) | None: will not slide - even at 90° |
| glass(G) | 90–100% | None: will not slide at 90% |
| glass(G) | 80% | Slides with substantial deposition "trail" at 15° angle |
| glass(G) | 50% | Slides with significant deposition "trail" |

*Beads have 50–180 μ size distribution. Larger beads generally slide more readily at slightly lower angles.

The polypropylene and glass values and observations (Table 13b) were found to be representative of other hydrophobic and hydrophilic surfaces, respectively. It was particularly significant that when a bead slurry was deposited on a surface and then blotted free of supernatant water, it would remain adhered even when held at a 90° angle. When such a partially dewatered bead deposit was contacted with an equal weight of water on a hydrophobic surface it would migrate quantitatively down the sheet at the minimum sliding angle for water on that surface. In contrast, a similarly treated bead deposit would sequentially deposit itself all along a hydrophilic surface when tilted at the "minimum sliding angle" for water on that surface. In addition, if the latter deposit was allowed to stand on the hydrophilic surface, within minutes, the beads would settle and the supernatant water would tend to run away from the bead deposit.

EXAMPLE 15
Plastic Collection Basin Dimensions and Geometry

A cone-shaped collection basin was fabricated such that it had a diameter of 10 feet at the top and sloped downward at a 50° angle to a 3-foot diameter opening which was positioned directly above a 4-foot-diameter, stacked, vibrating screen (from Sweco). The basin was constructed with wood and lined with polypropylene sheet plastic (⅛ inch thick) of the type tested in Example 14.

An access door and tubing port were configured on one side of the cone which permitted access to nozzles positioned inside the cone and intended to spray to the sides in a gentle arc. Alternatively, nozzles could be placed above and around the cone so their sprays do not overlap and so their sprays travel into the basin in an arc. It was also possible to configure nozzle(s) directly over the basin so they spray downward into the basin either with or without a sloped surface insert (as described in Example 11) to redirect the impact momentum of the spray. This sloped surface was constructed such that it fit within the cone and had legs that both adjusted its height and the gap between the lower edge of the sloped surface and the outer cone.

Around the upper edge of the basin was positioned a low pressure (10 psi) water line in the form of a 30-foot-long plastic tube having a ½-inch inner diameter and a single row of 1-mm-diameter holes spaced at 5-mm intervals. These holes were oriented such that they faced the polypropylene surface of the basin. In this way, the dropwise, gentle flow of water spread on the plastic and never hit the nascent beads directly. Any spray of water directly on the nascent beads was found to etch the surface and alter the bead's integrity.

A further advantage of this collection basin design is that it permits sprays to be directed from one or more nozzles around the periphery such that all sprays are directed into the center of the cone and beaded product proceeds downward with minimum extraneous water thereby making it possible to rapidly size classify the beads on a vibrating screen located beneath the collection basin.

EXAMPLE 16

Comparison of Various Nozzle Geometries and Configurations

Several different types of nozzles, all capable of forming fine mists or fogs with water, were examined for their efficacy in forming thermally-gelling beads. In each test, the nozzle was connected to a pressurized tank (approximately 80 psi) and a low-concentration agarose solution (65° C.) sprayed until a sufficient sample was obtained and the dimensions of the spray pattern measured. In addition to bead geometry and size distribution, increasing the throughput was a primary goal in order to optimize the commercial practicality of this method.

TABLE 14

| Supplier | Nozzle Type | Spray Angle | Flow Rate | Results (at 80 PSI) |
|---|---|---|---|---|
| Bete Fog* | Pin Jet (P10) | 90° | 10 gph | 45–200 μm spherical beads |
| Bete Fog | Pin Jet (P28) | 90° | 28 gph | 45–400 μm sph. beads |
| Bete Fog | Pin Jet (P40) | 90° | 40 gph | 45–500 μm sph. beads |
| Spray Sys. Inc. | LNN-8W; hollow cone; hydraulic atomizing | 152° | 11 gph | 45–180 μm sph. beads |
| Spray Sys. Inc. | LNN-22; hollow cone; hydraulic atomizing | 72° | 30 gph | 45–450 μm sph. beads |
| Spray Sys. Inc. | TT4w; ConeJett; fine | 140° | 6 gph | 45–180 μm sph. beads |

TABLE 14-continued

| Supplier | Nozzle Type | Spray Angle | Flow Rate | Results (at 80 PSI) |
|---|---|---|---|---|
| Steinen** (Oil spray nozzles) | spray atomizing PH (hollow cone) | 60° | 10 gph | 45–400 µm sph. beads |
| Steinen (Oil spray nozzles) | SS (semi-solid cone) | 60° | 12 gph | 45–400 µm sph. beads |
| Steinen (Oil spray nozzles) | SS (semi-solid cone) | 60° | 18 gph | 45–500+ µm misc. beads |
| Steinen (Oil spray nozzles) | SS (semi-solid cone) | 80° | 18 gph | 45–400 µm sph. beads |
| Steinen (Oil spray nozzles) | A-900 (hollow cone) | 80° | 12 gph | 45–310 µm sph. beads |
| Steinen (Oil spray nozzles) | A-750 (hollow cone) | 80° | 10 gph | 45–250 µm sph. beads |

*Bete Fog, Inc. (Greenfield, Massachusetts, USA)
**Wm. Steinen Mfg. Co. (Parsippany, New Jersey, USA)

These results indicated that a wide variety of different nozzle geometries and mechanisms of action can produce spherical gel beads of the desired diameters if they are capable of atomizing water to a fog or fine mist, even if, as with the oil burner nozzles, that is not one of their intended applications. As the concentration, and hence viscosity, of the agarose solution was increased (or the temperature lowered) it was found that the spray pressure had to be increased to obtain the desired bead size distribution. Similarly, slowing the flow rate at any given pressure, was found to increase the size of the beads produced and vice versa. Either increasing the pressure or increasing the spray angle tended to decrease the bead size distribution.

EXAMPLE 17

Maximizing Agarose Bead Solids Using Low-Viscosity Agarose

As a guide to how temperature-dependent viscosity would influence agarose fluid flow, a kinematic measure of viscosity was measured using a Zahn Cup Viscometer according to ASTM Method D-4212. To illustrate the disadvantage of higher-gelling-temperature agarose in a spray application, the viscosity of a typical D-2 agarose (which has a gel temperature of approximately 41° C.) was compared with a lower-temperature D-1 Gelidium-derived agarose (which has a gel temperature of approximately 35° C.) at three different temperatures. To show that even the D-2 type agarose can be used at high agarose concentrations, if it is partially depolymerized, the viscosity of low-viscosity D-2 agarose (i.e., slightly hydrolyzed) was compared at the same three temperatures.

The results, below, indicate that the low-viscosity D-2 agarose is still well below 200 cps at a 6% concentration while both the D-1 and D-2 types have exceeded 200 cps, which is the maximum viscosity at which the agarose sol is conveniently sprayable, at pressures of less than 90 psi with most nozzles. Because of the inherently lower viscosity of the low-viscosity D-2 agarose, it was found that spherical beads (45–400 μm) of this composition could still be sprayed at both 8% and 10% concentrations.

TABLE 15

| Concentration | Temperature | D-1 Agarose | D-2 Agarose | Low-Vis. D-2 |
|---|---|---|---|---|
| 0.5% | 75° C. | 1 | 1 | 1 |
| | 65° C. | 1 | 1 | 1 |
| | 55° C. | 1 | 2 | 1 |
| 1% | 75° C. | 17 | 14 | 13 |
| | 65° C. | 18 | 15 | 14 |
| | 55° C. | 19 | 18 | 17 |
| 2% | 75° C. | 26 | 20 | 17 |
| | 65° C. | 32 | 25 | 22 |
| | 55° C. | 44 | 36 | 26 |
| 4% | 75° C. | 43 | 70 | 58 |
| | 65° C. | 86 | 106 | 65 |
| | 55° C. | 103 | 138 | 80 |
| 6% | 75° C. | 212 | 220 | 115 |
| | 65° C. | * | * | 144 |
| | 55° C. | * | * | 155 |
| 8% | 75° C. | * | * | 215 |
| | 65° C. | * | * | 220 |
| | 55° C. | * | * | * |

*indicates a viscosity greater than 220 cps

EXAMPLE 18

Mixed-Gel Media

To produce ion exchange and affinity media using the method described in Example 1, a range of blends were made with mixtures of agar; agarose; kappa, iota, and lambda carrageenan; arabinogalactan; furcellaran; alginate; pectin; locust bean gum; carboxy methyl cellulose (CMC); water-miscible synthetic polymers, such as polyvinylpyrrolidone, polyvinyl alcohol, polyethylene glycol, polyoxyethylene and linear polyacrylamide; gelatin and a variety of both gelling and non-gelling polymers. Once cast as sprayed beads, such mixtures often must be crosslinked in non-aqueous solvents to prevent diffusion of any ungelled or cation-dependent gel polymers from diffusing out of the beads.

The temperature of spraying should be at least about 10° C. above the dynamic gelling temperature of the mix. The pressure and nozzle selected should produce a fine mist (having a droplet size of 50–400 μm), and the collection surface should be positioned based on the teaching of previous Examples. The arabinogalactin sample was obtained from Larex, Inc. (St. Paul, Minn., USA); the other polymer additives were obtained from either TIC Gums, Inc. (Belcamp, Md., USA) or Hispanagar, SA (Madrid, Spain).

Using such conditions, mixed gel beads with the following characteristics were produced using the spray methods herein described:

TABLE 16

| Agarose Type | Conc. | Other Polymer | Conc. | GT. | Spray Temp. | Microscopic Results |
|---|---|---|---|---|---|---|
| D-1 | 0.5% | Agar | 2% | 38 | 70° C. | Most: indiv. spherical beads |
| D-2 | 1% | Arabino-galactan | 4% | 42 | 70° C. | Most: indiv. spherical beads |
| D-2 | 1% | Arabino-galactan | 30% | n.a. | 80° C. | Most: indiv. spherical beads |
| D-2 | 1% | k-carrageenan | 2% | 45 | 85° C. | Most: indiv. spherical beads |
| D-2 | 4% | L-carrageenan | 0.5% | n.a. | 85° C. | Most: indiv. spherical beads |
| D-2 | 1% | low-viscosity alginate | 1% | 42 | 70° C. | Most: indiv. spherical beads |

TABLE 16-continued

| Agarose Type | Conc. | Other Polymer | Conc. | GT. | Spray Temp. | Microscopic Results |
|---|---|---|---|---|---|---|
| D-2 | 3% | Arabino-galactin | 40% | 44 | 75° C. | Most: brown, indiv. spherical beads |
| D-2 | 3% | Gum arabic | 20% | 43 | 75° C. | Most: indiv. spherical beads |

EXAMPLE 19
Entrapment of Granules in Sprayed Beads

Four grams of D-2 agarose were dispersed in 100 ml of cold water and placed in a microwave until the water had boiled and the agarose dissolved. A 10 ml aliquot was then removed and 1 g of Hylon VII high amylose starch (National Starch) was dispersed and mixed until homogeneously distributed. Using the Spraymaster®, hand-pumped sprayer, the nozzle and inlet tube were prewarmed with hot (75° C.) water before rapidly aspirating and spraying the agarose/starch dispersion at a height of about 3 feet in a lateral direction above a 2×4 feet sheet of black plastic. The resultant white beads were readily visible against the plastic and immediately transferred into a capped, plastic sample tube. A sample of the sprayed beads was examined under the microscope and found to have uniform, spherical beads (50–300 µm diameter) containing dense starch granules (4–10 Elm diameter). It was immediately recognized that such beads could be used for desalting of proteinaceous solutions because the dense starch granules could absorb water and salt through osmosis but would exclude the high molecular weight proteins. It was surprising that the presence of the microparticulated starch did not plug the nozzle or otherwise affect the shape or size distribution of the agarose beads.

To a second 10 ml aliquot of the 4% D-2 agarose solution was added 1 gram of commercial "tricalcium phosphate" (TCP; FMC Corp.), which was mixed until thoroughly dispersed. Unlike the starch dispersion, the higher density of the TCP resulted in settling of the dispersion when mixing was discontinued. Nevertheless, the Spraymaster sprayer was preheated, as before, and the agarose/TCP mixture was sprayed on a fresh sheet of black plastic from a height of about 3 feet above the plastic surface. After microscopic examination (100×) of the resultant beads (50–300 µm), it was evident that the agarose beads were spherical and had the same size distribution as before. The dense TCP was randomly distributed throughout the beads. It was immediately recognized that such beads could be used as an ion exchange medium which could be made to have a higher surface area than conventional hydroxylapatite ($Ca_3(PO_4)_2 \cdot xH_2O$), which utilizes large crystals of this inorganic solid. Given the high incidence of solids (10% w/v), it was surprising that there was little tendency of the suspension to plug or interrupt normal nozzle operation and spraying.

EXAMPLE 20
Suitability of Additional Thermally-Gelling Polymers for Forming Beads in Accordance with Methods of this Invention It is well known that gelatin, pectin and starch are all thermally-gelling polymers under the right conditions. For example, all of the above polymers are known to gel at ambient conditions if the level of sugar or dissolved solids is greater than 60%, as it is in "gummy" confections or jellies. It is also well known that both gelatin and starch can be dissolved in boiling water and cooled under refrigeration to form gels which will remain intact at ambient temperatures below about 40° C. It is less well known that high concentrations (greater than 4%) of certain types of starch (high amylose) and gelatin can form firm gels at ambient temperature. To test their suitability as bead-forming polymers under the conditions of this method, the following experiments were performed:

Gelatin:

The gel strength of a 100 g aliquot of commercial gelatin (Juicy Gels® from Hunt's) was found to be about 106 g/cm². This aliquot was melted in a microwave and divided into two portions. The first melted portion was placed in a refrigerator at 10° C. for about 45 minutes, where it regelled. The temperature of the second melted portion was cooled to 75° C. before spraying with a Spraymastere hand sprayer at ambient temperature (23° C.) about 3 feet above a horizontal, plastic collection surface. The resultant gel product was creamy and discontinuous but had no discrete beaded structure. To the extent that the sprayed droplets formed beads, they annealed upon contact. Many entrapped air bubbles were found entrapped in the gelatin masses.

A fresh 50 g aliquot of the gelatin was melted as before but then admixed with an equal weight of 4% D-2 agarose solution at 75° C. The resultant mixture (2% agarose and about 2.5% gelatin) was stirred well and was then immediately sprayed in the manner described, above. Discrete beads formed which did not anneal or stick together when they contacted the plastic sheet. Surprisingly, the beads exhibited the standard bead size distribution which would be expected for standard 2% agarose beads sprayed under similar conditions.

Starch:

To 100 ml of water was added 8 g of Hylon® VII, a high-amylose starch manufactured by National Starch (Bridgewater, N.J., USA). The starch was stirred well before microwave heating to a boil. The starch was then maintained at that temperature for about 30 minutes. The mixture was then allowed to cool to 25° C. The supernatant liquid resembled skim milk and the bottom layer had a clotted texture similar to soft yogurt. Thus, boiling and cooling had not formed a strong gel as it had with the seaweed derived polymers described earlier.

Hylon® VII (24 g) was then dispersed in 300 ml of water and autoclaved at 130° C. for 80 minutes, cooled to 75° C. and laterally sprayed with a Spraymaster® sprayer about 3 feet above a plastic surface. A microscopic examination of the sprayed product revealed no beads. There were clumps of varying sizes and shapes (most greater than 200 µm). Surprisingly, there was no substantial plugging of the nozzle although the spray pattern had a greatly reduced spray angle (about 30–40° instead of 80–90°). When a small drop of the fluidized starch at 75° C. was placed on a 22° C. glass surface for several minutes, it finally formed a soft paste but not a firm gel. Similarly, after overnight standing, the gel strength of the parent sample was found to still be only about 50 g/cm² (i.e., a weak gel).

Hylon® VII (160 g) was dispersed in 2 liters of water and placed in a 1 gallon pressure cooker. The starch slurry was then heated with constant agitation until a pressure of 5 psi pressure had been reached and maintained for 10 minutes. The resultant gel was cooled to 25° C. overnight, and the gel strength was found to be 150 g/cm². It is possible that higher temperatures and pressures may produce an amylose slurry that is sufficiently gelatinized to be both sprayable and nearly-instantaneously gellable under ambient conditions. Rapid gelation of such jet-cooked starch could be facilitated by the addition of dissolved sugar or low molecular weight solids.

Hylon® VII, either cooked or uncooked, could readily be incorporated into an agarose solution and sprayed as spherical beads as described in Example 19.

Pectin:

A 150 g sample of commercial apple jelly (manufactured by The Smuckers Co., Orrville, Ohio, USA) was found to have a gel strength of 20 g/cm². The sample was melted in a microwave and divided into two 75 g portions. One was set aside to cool and was found to regel at ambient temperature after overnight standing. The second aliquot was cooled to 75° C. and sprayed with a Spraymaster® sprayer at a height of 3 feet over a sheet of plastic. The resultant sprayed product was recovered from the plastic and examined microscopically. No beads or discrete structures were found but a substantial number of air bubbles were seen due to incomplete deaeration after liquification. It was surmised that the droplets either did not gel sufficiently before impact or annealed together after gelation. In any case, it was clear that a thermally-gelling composition of this kind was not readily amenable to this approach.

A second sample (50 ml) of the apple jelly was melted in the microwave and combined with 50 ml of a 4% agarose solution at 75° C. The resultant mixture, after thorough mixing and deaeration, was sprayed with a Spraymaster® sprayer in the manner described above, and the product was found to contain discrete, spherical agarose beads (45–300 µm) containing pectin and dissolved sugar solids.

Thus, its was shown that even thermally-gelling polymers which are not, themselves, readily amendable to the spray method of this invention may, nevertheless, be accommodated if first admixed with a thermally-gelling seaweed polymer such as agarose, agar or carrageenan.

EXAMPLE 21

Hydrophobic Micro-Inclusions Within Agarose Beads

Methods of this invention can also be used to form hydrophobic chromatographic media. An agarose bead, by itself, is inherently hydrophilic. However, companies have traditionally fabricated hydrophobic chromatographic media by derivatizing agarose beads with low-molecular-weight hydrophobic substituents ranging from methyl to fatty acids in size but typically nonyl or phenyl substituents.

The applicant has found that emulsified hydrophobic oils, waxes or proteins (such as gliadin glutenin or zein) can be incorporated into the agarose and immediately sprayed to form beads. The result is agarose beads having a multitude of micron-sized hydrophobic droplets or solids trapped within each bead. The hydrophobic surfaces of the lipid inclusions bind to hydrophobic moieties in the chromatographic eluate and, hence, act like covalently-attached hydrophobic substituents on the agarose matrix. An advantage of this method is that it does not require covalent chemistry, which is both difficult and expensive for hydrophobic substituents. In this method, one simply mixes two water-based systems, wherein the first is an agarose sol, and the second is a water-based hydrophobic dispersion. The mixture is then sprayed into the air and cooled, thereby entrapping the hydrophobic fraction as spherical micron-sized inclusions within spherical, 45-to-300-µm agarose beads.

Formation of Agarose Microparticles with Wax Micro-Inclusions:

This method allows for the incorporation of liquid oils or solid oils (at 25° C.) as well as waxes such as beeswax, candillila wax and carnauba wax. The most challenging is carnauba wax and that procedure is described, below. All of the above lipid types can be stabilized with emulsifiers having an HLB between 9 and 18.

The carnauba wax was melted at 95° C., and the oil temperature was raised to about 120° C. For a 20% wax solids dispersion, 200 g of melted carnauba wax was added to a liter of a homogenized aqueous emulsion containing 2% w/v Myrj® 52 surfactant (manufactured by ICI). To prevent foaming, a small amount (0.02%) of silicone antifoam (Harcros® Organic Antifoam 8810 FG; Harcros, Kansas City, Kans., USA) was added to the homogenized emulsifier before addition of the hot melted wax. The shear of mixing was best done at about 10,000 RPM using an Omni® homogenizer. After homogenizing the emulsified wax for about 15 minutes, the emulsion pan was transferred to an ice bath with continued homogenization until the emulsion temperature had fallen to about 25° C.

The wax microdispersion was then filtered through a fine mesh cheese cloth to remove any large microparticles. The filtered wax microdispersion was then warmed to 50° C. and incorporated into an agarose solution (1–10%), with the agarose solution cooled below the melting temperature of the wax. Mixing of the lipid dispersion into the agarose solution was best achieved with an overhead stirrer at relatively-low mixing speeds (less than 50 revolutions per minute). The lipid dispersion in agarose was then sprayed laterally at 75° C. using a Spraymaster® sprayer about 3 feet over a plastic surface. The resultant beaded product, when examined microscopically, revealed a multitude of lipid microspheres entrapped within each bead. By adjusting the ratio of the mixture, one can create hydrophilic beads having hydrophobic micro-inclusions thus enabling them to be used for separating substances according to their affinity for hydrophobic surfaces.

Formation of Agarose Microparticles with Hydrophobic Protein Micro-Inclusions:

To illustrate the use of hydrophobic protein dispersions, a 10 ml commercial sample of a dispersion of gliadin and glutenin was incorporated into a 3% agarose solution after cooling the latter to 55° C. The gliadin and glutenin dispersion can be made according to processes described in U.S. Pat. No. 5,705,207, filed Jan. 7, 1998, and U.S. Pat. No. 5,736,178, filed Apr. 7, 1998. Immediately after incorporation, the solution was sprayed with a Spraymaster® sprayer into a dilute alkaline solution (0.1 NaOH) to counteract potential agarose hydrolysis. When the product was microscopically examined, it was found that stabilized gliadin and glutenin microspheres were entrapped in each spherical agarose bead. The resultant beads had diameters of 45 to 350 µm and were potentially useful as hydrophobic chromatography media.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of forming microparticles of a thermally-gelled polysaccharide, comprising:

spraying a composition comprising thermally-gelling polysaccharide and an aqueous medium into ambient air to produce aerial-gelled microparticles; and collecting the gelled microparticles, wherein the microparticles have a diameter greater than 50 micrometers and a gel strength sufficient to maintain microparticle integrity upon collection thereof, wherein the microparticles remain substantially hydrated throughout the method.

2. The method of claim 1, wherein the gelled microparticles are substantially spherical.

3. The method of claim 2, wherein the gelled microparticles have diameters of less than 500 micrometers.

4. The method of claim 3, wherein the composition is sprayed into the ambient air with a water-atomizing nozzle.

5. The method of claim 4, wherein the water-atomizing nozzle is an airless nozzle.

6. The method of claim 1, wherein the gelled microparticles have a gel strength sufficient for performing gel chromatography.

7. The method of claim 1, wherein the polysaccharide is selected from the group consisting of agar; agarose; carrageenan; furcelleran; and extracellular polysaccharide obtained by the aerobic fermentation of Psuedomonas elodea; derivatives of the proceeding polysaccharides, each having a gel strength of at least about 50% compared to the gel strength of the polysaccharide from which it is derived; and combinations thereof.

8. The method of claim 1, wherein the gelled microparticles have a diameters of less than about 180 micrometers.

9. The method of claim 1, wherein the gelled microparticles have diameters in the range of about 180 to about 250 micrometers.

10. The method of claim 1, wherein the gelled microparticles have diameters of greater than about 250 micrometers.

11. The method of claim 1, wherein at least about 50% of the gelled microparticles are monomorphic spheres.

12. The method of claim 11, wherein at least about 50% of the gelled microparticles are free of air bubbles.

13. The method of claim 1, further comprising the step of size fractionating the gelled microparticles as a moist, high-solids slurry.

14. The method of claim 1, wherein the gelled microparticles are collected on a solid surface.

15. The method of claim 14, wherein the solid surface is sloped.

16. The method of claim 15, wherein the solid surface is in the form of a basin having a perimeter and a center, wherein the basin slopes radially downward from the perimeter toward the center.

17. The method of claim 15, wherein a film of water is generated on the solid surface to enhance transport of the gelled microparticles off of the solid surface.

18. the method of claim 1, wherein the gelled microparticles are collected in a basin of water, wherein the surface tension of the water is lower than that of pure water.

19. The method of claim 1, wherein the gelled microparticles have a solids content of from about 0.5% to about 50% weight/volume.

20. The method of claim 1, wherein the composition is delivered to the water-atomizing nozzle from a vessel with a temperature at least about 5° C. above the gelling temperature of the thermally-gelled polysaccharide.

21. The method of claim 1, wherein the composition is delivered to the water-atomizing nozzle from a vessel with a temperature at least about 10° C. above the gelling temperature of the thermally-gelling polysaccharide.

22. The method of claim 1, wherein the composition is sprayed in the form of a hollow cone.

23. The method of claim 19, wherein the composition is sprayed upward.

24. The method of claim 23, wherein the composition is atomized by pulsed spraying.

25. The method of claim 1, wherein the composition is sprayed in the form of a full of hollow cone.

26. The method of claim 25, wherein the composition is sprayed laterally or downward.

27. The method of claim 26, wherein the composition is atomized by pulsed spraying.

28. The method of claim 1, wherein the composition further comprises at least one water-soluble polymer.

29. The method of claim 1, further comprises the step of using the microparticles to perform chromatography.

30. The method of claim 1, further comprising the step of using the microparticles to perform gel diffusion chromatography.

31. The method of claim 1, wherein air bubbles are mixed into the composition before spraying and incorporated in gelled microparticles suitable for performing gel chromatography, wherein each of the air bubbles has a diameter of less than one-quarter of the diameter of the gelled microparticle in which the air bubble is incorporated, and wherein the air bubbles do not significantly affect the exclusion limit of the gelled microparticles.

32. The method of claim 31, further comprising the step of using the microparticles to perform affinity chromatography.

33. The method of claim 1, wherein granules are incorporated into the microparticles.

34. The method of claim 1, wherein the microparticles include a thermally-gelling polymer selected from the group consisting of gelatin, pectin and starch.

35. The method of claim 1, wherein the microparticles include hydrophobic micro-inclusions.

36. A method of forming microparticles of a thermally-gelled polysaccharide, comprising:
spraying a sol of a thermally-gelling polysaccharide through an airless nozzle to form a fine mist of the sol in ambient air; and
allowing the sprayed sol to gel into spherical microparticles in the air, wherein the spherical microparticles have a gel strength sufficient to maintain microparticle integrity upon collection thereof.

37. The method of claim 36, wherein the spherical microparticles have diameters greater than 50 micrometers and less than 500 micrometers.

38. The method of claim 37, wherein the sol is aqueous.

39. The method of claim 38, wherein the polysaccharide is selected from the group consisting of agar, agarose, carrageenan, furcelleran, an extracellular polysaccharide obtained by the aerobic fermentation of Pseudomonas elodea, derivatives of the preceding polysaccharides, each having a strength at least about 50% as great as the polysaccharide from which it is derived, and combinations thereof.

40. The method of claim 39, wherein the solids content of the spherical microparticles is from about 0.5% to about 50% weight/volume.

41. The method of claim 40, further comprises the steps of collecting the spherical microparticles on a solid surface and establishing a continuous flow of the spherical microparticles as a moist, high-solids slurry from the solid surface through at least one sieve.

42. The method of claim 41, wherein the sol is sprayed in the form of a hollow cone.

43. The method of claim 42, wherein the sol is sprayed upward.

44. The method of claim 41, wherein the sol is atomized by pulsed spraying.

45. The method of claim 40, further comprising the step of using the thermally-gelled microparticles to perform gel diffusion chromatography.

46. The method of claim 33, wherein the granules comprise an organic substance that does not dissolve in water at or below ambient temperature.

47. The method of claim 46, wherein the granules comprise starch.

48. The method of claim 33, wherein the granules comprise an inorganic substance that does not dissolve in water at or below ambient temperature.

49. The method of claim 48, wherein the granules comprise tricalcium phosphate.

50. The method of claim 1, wherein the composition comprises at least two gelling polymers.

51. A method of forming microparticles of a thermally-gelling polysaccharide, comprising:

spraying a composition comprising thermally-gelling polysaccharide and an aqueous medium into ambient air, using a water-atomizing nozzle to produce aerial-gelled microparticles; and collecting the gelled microparticles, wherein the microparticles have a diameter greater than 50 micrometers and a gel strength sufficient to maintain microparticle integrity upon collection thereof, wherein the microparticles remain hydrated through the method.

52. The method of claim 51, wherein the water-atomizing nozzle is an airless nozzle.

53. The method of claim 1, whereby the microparticles are formed in the absence of organic solvent.

54. A method of forming microparticles of a thermally-gelled polysaccharide, comprising:

spraying a composition in the form of a sol comprising thermally-gelling polysaccharide and an aqueous medium into ambient air using a water-atomizing nozzle, to produce aerial-gelled microparticles; and collecting the gelled microparticles, wherein the microparticles have a diameter greater than 50 micrometers and a gel strength sufficient to maintain microparticle integrity upon collection thereof and for performing gel chromatography; wherein the microparticles remain hydrated throughout the method.

* * * * *

UNITED STATES PATENT AND TRADEMARK OFFICE
CERTIFICATE OF CORRECTION

PATENT NO.   : 6,248,268 B1
DATED        : June 19, 2001
INVENTOR(S)  : Richard B. Cook It is certified that error appears in the above-identified patent and that said Letters Patent is hereby corrected as shown below:

Column 25, claim 25,
Line 63, delete the second "of" and insert -- or --.

Column 26, claim 41,
Line 49, delete "comprises" and insert -- comprising --.

Column 25, claim 18,
Line 42, delete "the" and insert -- The --.

Column 26, claim 29,
Line 3, delete "comprises" and insert -- comprising --.

Signed and Sealed this

Fifteenth Day of January, 2002

Attest:

JAMES E. ROGAN
*Attesting Officer*   *Director of the United States Patent and Trademark Office*

UNITED STATES PATENT AND TRADEMARK OFFICE
CERTIFICATE OF CORRECTION

PATENT NO.     : 6,248,268 B1
DATED          : June 19, 2001
INVENTOR(S)    : Richard B. Cook It is certified that error appears in the above-identified patent and that said Letters Patent is hereby corrected as shown below:

<u>Column 25, claim 7,</u>
Line 12, delete "and" and insert -- an --.

Signed and Sealed this

Ninth Day of April, 2002

Attest:

JAMES E. ROGAN
*Attesting Officer*       *Director of the United States Patent and Trademark Office*